D. C. MATTESON & T. P. WILLIAMSON.
HORSE HOE.
No. 83,719.            Patented Nov. 3, 1868.
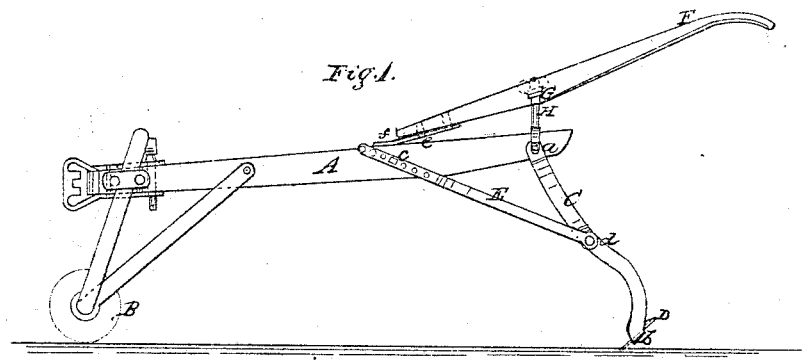
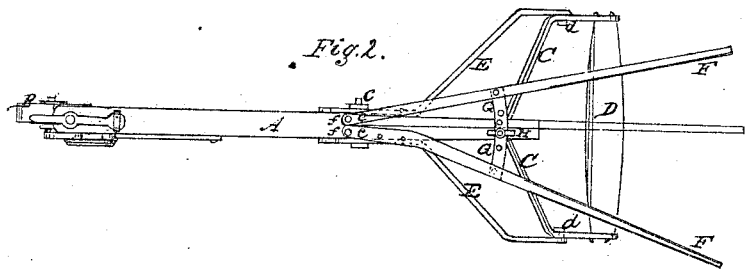
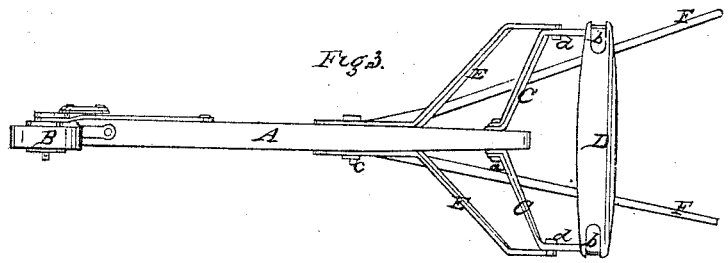
Witnesses
Wm A Morgan
G. C. Cotton
Inventor
Don Carlos Matteson
T. P. Williamson
per Munn & Co
Attorneys

United States Patent Office.

DON CARLOS MATTESON AND TRUMAN PANE WILLIAMSON, OF STOCKTON, CALIFORNIA.

Letters Patent No. 83,719, dated November 3, 1868.

IMPROVEMENT IN HORSE-HOES.

The Schedule referred to in these Letters Patent and making part of the same.

*To all whom it may concern:*

Be it known that we, DON CARLOS MATTESON and TRUMAN PANE WILLIAMSON, of Stockton, in the county of San Joaquin, and State of California, have invented a new and improved Horse-Hoe; and we do hereby declare that the following is a full, clear, and exact description thereof, which will enable those skilled in the art to make and use the same, reference being had to the accompanying drawings, forming part of this specification.

This invention relates to a new and improved horse-hoe, designed for cultivating crops grown in hills or drills, by loosening up the earth, and cutting weeds below the surface of the same.

The invention consists in a novel manner of attaching the cutter to the implement.

In the accompanying sheet of drawings—
Figure 1 is a side view of the invention.
Figure 2, a plan or top view of the same.
Figure 3, an inverted plan of the same.

Similar letters of reference indicate corresponding parts.

A represents the beam of the implement, the front part of which is supported by a gauge-wheel, B.

To each side of the beam A, near its rear end, there are attached curved bars C C, said bars being attached to the beam by a pivot-bolt, *a*, and the lower ends of these bars are bent inward, or towards each other, to form lips *b b*, on which the cutter D rests, the ends of the cutter being notched to receive the lower parts of the bars C C.

Bolts may pass through the lips *b* and cutter D, to secure the latter in position.

The cutter D is formed of a sheet of steel or iron, provided with steel edges, the cutter being double-edged, and each edge slightly convex in a longitudinal direction, as shown in figs. 2 and 3.

The bars C C are braced and retained in proper position by bars E E, the front ends of which are attached to the beam, one at each side, by a bolt, *c*, the rear ends of the bars E being connected to the bars C C, near their centres, by pivot-bolts *d*.

The front ends of the bars E are perforated with a series of holes, through any of which the bolt *c* may pass, and consequently it will be seen that by adjusting the bars E more or less forward, a greater or less "rake," or inclination, may be given the cutter D, as desired.

This cutter, as the implement is drawn along, cuts off weeds below the surface of the earth, and loosens or lightens up the same, to render it permeable to air and moisture, and thereby facilitate the growth of the plants.

The cutter, it will be seen, may be reversed in position, either edge adjusted forward, so that when one edge becomes worn by use, the other may be employed, and the cutter may also be adjusted either side uppermost, so that it will be self-sharpening to a certain extent.

F F represent the handles of the implement, the front or lower ends of which have metal plates *e* attached, which are secured to the beam, each by a bolt, *f*, to admit of the lateral adjustment of the handles. Each handle, F, has a segment-bar, G, secured to and projecting from its inner side.

These bars G lap, one over the other, are perforated, and a screw-bolt, H, attached to the beam, passes through the plates, holding them and the handles in proper position.

By this arrangement, either handle may be adjusted more or less inward towards the beam, so as to admit of the implement working quite close to trees. (See fig. 2, in which one of the handles is shown adjusted in line with the beam A.)

We claim as new, and desire to secure by Letters Patent—

The combination of the reversible double-edged cutter D, the pivoted bars C C, and adjustable braces E, with a beam, A, substantially as described.

DON CARLOS MATTESON.
TRUMAN PANE WILLIAMSON

Witnesses for MATTESON:
  WM. F. MCNAMARA,
  T. B. MOSHER.
Witnesses for WILLIAMSON:
  R. W. BRUSH,
  CARLOS W. MATTESON.